United States Patent
Maezawa et al.

(10) Patent No.: US 8,031,296 B2
(45) Date of Patent: *Oct. 4, 2011

(54) LIQUID CRYSTAL PANEL AND LIQUID CRYSTAL DISPLAY APPARATUS

(75) Inventors: Shouhei Maezawa, Osaka (JP); Teppei Niinou, Osaka (JP); Tatsuya Osuka, Osaka (JP); Shinobu Nagano, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 365 days.

This patent is subject to a terminal disclaimer.

(21) Appl. No.: 12/067,335

(22) PCT Filed: Mar. 26, 2007

(86) PCT No.: PCT/JP2007/056197
§ 371 (c)(1),
(2), (4) Date: Mar. 19, 2008

(87) PCT Pub. No.: WO2007/116683
PCT Pub. Date: Oct. 18, 2007

(65) Prior Publication Data
US 2010/0182546 A1    Jul. 22, 2010

(30) Foreign Application Priority Data
Apr. 5, 2006  (JP) ................... 2006-104430

(51) Int. Cl.
*G02F 1/1335* (2006.01)
(52) U.S. Cl. .......................................... 349/96
(58) Field of Classification Search ........................ None
See application file for complete search history.

(56) References Cited

U.S. PATENT DOCUMENTS

| | | | |
|---|---|---|---|
| 5,663,777 A | 9/1997 | Aoyama | |
| 6,111,696 A * | 8/2000 | Allen et al. | 359/495 |
| 6,760,157 B1 * | 7/2004 | Stover et al. | 359/494 |
| 6,809,789 B2 | 10/2004 | Kim et al. | |
| 7,622,164 B2 * | 11/2009 | Jones et al. | 428/1.1 |
| 2002/0067448 A1 | 6/2002 | Kim et al. | |
| 2006/0210726 A1* | 9/2006 | Jones et al. | 428/1.1 |

(Continued)

FOREIGN PATENT DOCUMENTS

EP  724180 A2 *  7/1996

(Continued)

OTHER PUBLICATIONS

International Search Report of PCT/JP2007/056197, date of mailing Jun. 26, 2007.

(Continued)

*Primary Examiner* — Michelle R Connelly Cushwa
(74) *Attorney, Agent, or Firm* — Westerman, Hattori, Daniels & Adrian, LLP

(57) ABSTRACT

It is an object of the present invention to provide a liquid crystal display panel having a high contrast ratio. A liquid crystal panel according to an embodiment of the present invention includes: a liquid crystal cell; a first polarizing plate placed on a viewer side of the liquid crystal cell; and a second polarizing plate placed on an opposite side of the liquid crystal cell with respect to the viewer side. A light transmittance ($T_2$) of the second polarizing plate is larger than a light transmittance ($T_1$) of the first polarizing plate. Such a liquid crystal panel has a remarkably high contrast ratio and shows excellent display properties, compared to conventional liquid crystal panel.

8 Claims, 2 Drawing Sheets

U.S. PATENT DOCUMENTS

| | | | |
|---|---|---|---|
| 2006/0227423 A1* | 10/2006 | Saiki et al. | 359/490 |
| 2006/0270773 A1* | 11/2006 | Hale et al. | 524/423 |
| 2007/0263152 A1* | 11/2007 | Mazaki et al. | 349/130 |
| 2007/0285779 A1* | 12/2007 | Walker et al. | 359/494 |
| 2008/0007680 A1* | 1/2008 | Kitagawa et al. | 349/118 |
| 2009/0103017 A1* | 4/2009 | Maezawa et al. | 349/96 |
| 2009/0207347 A1* | 8/2009 | Shimizu et al. | 349/96 |
| 2009/0316086 A1* | 12/2009 | Ishii et al. | 349/96 |
| 2010/0110347 A1* | 5/2010 | Kitagawa et al. | 349/96 |
| 2010/0141873 A1* | 6/2010 | Kinjo et al. | 349/96 |

FOREIGN PATENT DOCUMENTS

| | | | |
|---|---|---|---|
| JP | 57128320 A | * | 8/1982 |
| JP | 6-281927 A | | 10/1994 |
| JP | 07-318925 A | | 12/1995 |
| JP | 07318925 A | * | 12/1995 |
| JP | 08-184844 A | | 7/1996 |
| JP | 09-269504 A | | 10/1997 |
| JP | 10-160935 A | | 6/1998 |
| JP | 10160935 A | * | 6/1998 |
| JP | 2000-180844 A | | 6/2000 |
| KR | 1020020044293 A | | 6/2002 |
| KR | 1020060009837 A | | 2/2006 |

OTHER PUBLICATIONS

Japanese Office Action mailed on Jun. 8, 2011, issued in corresponding Japanese Patent Application No. 2007-070276.

* cited by examiner

LIQUID CRYSTAL PANEL AND LIQUID CRYSTAL DISPLAY APPARATUS

TECHNICAL FIELD

The present invention relates to a liquid crystal panel having a polarizing plate with a adjusted light transmittance.

BACKGROUND ART

A liquid crystal display apparatus (hereinafter, referred to as "LCD") is a device for displaying characters and images, using electrooptical properties of liquid crystal molecules, and has been widely used for cell phones, laptop computers, liquid crystal televisions, and the like. The LCD generally uses a liquid crystal panel, in which polarizing plates are arranged on both sides of a liquid crystal cell, and can display a black image under no voltage application, for example, in a normally black mode (e.g., see Patent Document 1). Recently, as the definition of the LCD has been increased, and the range of applications thereof has been enlarged, there is a demand for a liquid crystal panel exhibiting a high contrast ratio, capable of drawing characters and images more vividly.
Patent Document 1: JP 9-269504 A

DISCLOSURE OF THE INVENTION

Problems to be Solved by the Invention

It is an object of the present invention to provide a liquid crystal display panel having a high contrast ratio.

Means for Solving the Problems

The present inventors have conducted intensive studies for solving the above problems, and have found that the above objects can be attained with the liquid crystal panel described below, to thereby complete the present invention.

A liquid crystal panel according to an embodiment of the present invention includes: a liquid crystal cell; a first polarizing plate placed on a viewer side of the liquid crystal cell; and a second polarizing plate placed on an opposite side of the liquid crystal cell with respect to the viewer side. A light transmittance ($T_2$) of the second polarizing plate is larger than a light transmittance ($T_1$) of the first polarizing plate.

In one embodiment of the invention, a difference ($\Delta T = T_2 - T_1$) between the light transmittance ($T_2$) of the second polarizing plate and the light transmittance ($T_1$) of the first polarizing plate is 0.1% to 6.0%.

In another embodiment of the invention, the liquid crystal cell includes a liquid crystal layer containing liquid crystal molecules arranged in a homogeneous alignment in the absence of an electric field.

In still another embodiment of the invention, the light transmittance ($T_1$) of the first polarizing plate is 38.3% to 43.3%.

In still another embodiment of the invention, the light transmittance ($T_2$) of the second polarizing plate is 41.1% to 44.3%.

Instill another embodiment of the invention, a degree of polarization of the first polarizing plate and/or the second polarizing plate is 99% or more.

In still another embodiment of the invention, the first polarizing plate includes a first polarizer, the second polarizing plate includes a second polarizer, and the first polarizer and the second polarizer respectively contain as a main component an iodine-containing polyvinyl alcohol-based resin.

In still another embodiment of the invention, a difference ($\Delta I = I_1 - I_2$) between an iodine content ($I_1$) of the first polarizer and an iodine content ($I_2$) of the second polarizer is 0.1% by weight to 1.9% by weight.

In still another embodiment of the invention, the iodine content of the first polarizer and/or the second polarizer is 2.0% by weight to 5.0% by weight.

In still another embodiment of the invention, the first polarizer and/or the second polarizer further contain potassium, and a content of the potassium is 0.2% by weight to 1.0% by weight.

In still another embodiment of the invention, the liquid crystal panel further includes a brightness enhancing film on an opposite side of the second polarizing plate with respect to the liquid crystal cell side.

In still another embodiment of the invention, the brightness enhancing film is a laminate including a thermoplastic resin layer (A) and a thermoplastic resin layer (B), and an in-plane birefringence of the thermoplastic resin layer (A) is 0.05 or more.

According to another aspect of the invention, a liquid crystal display apparatus is provided. The liquid crystal display apparatus includes the liquid crystal panel as described above.

Effects of the Invention

By arranging two polarizing plates each having a adjusted light transmittance on each side of a liquid crystal cell, a liquid crystal display apparatus including a liquid crystal panel of the present invention has a remarkably high contrast in a front direction and shows excellent display properties, compared with conventional liquid crystal panel.

DESCRIPTION OF REFERENCE NUMERALS

Figure 1:
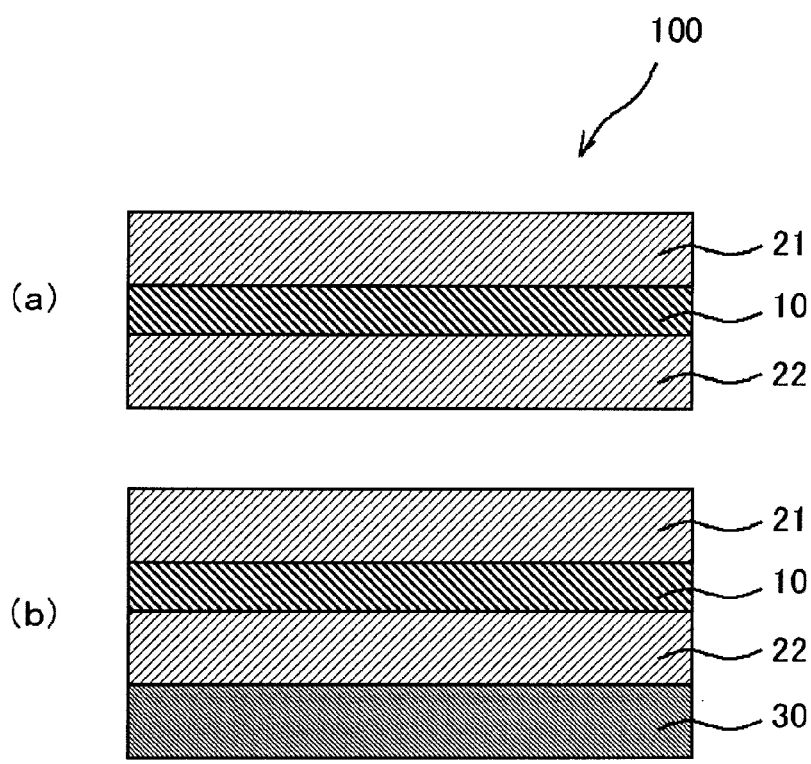
FIG. 1(a) Schematic cross-sectional view of a liquid crystal panel according to a preferred embodiment of the present invention.
FIG. 1(b) Schematic cross-sectional view of a liquid crystal panel according to a preferred embodiment of the present invention.

10 Liquid crystal cell
21 First polarizing plate
22 Second polarizing plate
30 Brightness enhancing film
80 Backlight unit
81 Light source
82 Reflective film
83 Diffusion plate
84 Prism sheet
100 Liquid crystal panel
301 Polymer film containing as a main component a polyvinyl alcohol-based resin
300 Feed roller
310 Swelling bath
320 Coloring bath
311, 312, 321, 322, 331, 332, 341, 342 Roll 330 First cross-linking bath
340 Second cross-linking bath
350 Water washing bath
360 Drying means
370 Polarizer
380 Take-up part

BEST MODE FOR CARRYING OUT THE INVENTION

Definition of Terms and Symbols

The definition of the terms and symbols in the specification of the present invention are as follows.

(1) Light Transmittance of Polarizing Plate

A light transmittances (T) of a polarizing plate refers to a Y value obtained through visibility correction by a two-degree field of view (C light source) in accordance with JIS Z 8701-1982.

(2) Refractive Index (nx, ny and nz)

"nx" represents a refractive index in a direction in which an in-plane refractive index becomes maximum (i.e., in a slow axis direction), "ny" represents a refractive index in a direction perpendicular to the slow axis in the same plane, and "nz" represents a refractive index in a thickness direction.

(3) In-Plane Retardation Value

An in-plane retardation value (Re[λ]) refers to an in-plane retardation value of a film at a wavelength λ (nm) at 23° C. Re[λ] is obtained by Re [λ]=(nx−ny)×d where the thickness of the film is d (nm).

(4) Thickness Direction Retardation Value

A thickness direction retardation value (Rth[λ]) refers to a retardation value in a film thickness direction at a wavelength λ (nm) at 23° C. Rth[λ] is obtained by Rth[λ]=(nx−nz)×d where the thickness of the film is d (nm).

<A. Overview of a Liquid Crystal Panel>

A liquid crystal panel of the present invention includes a liquid crystal cell, a first polarizing plate placed on a viewer side of the liquid crystal cell, and a second polarizing plate placed on the opposite side of the liquid crystal cell with respect to the viewer side. A light transmittance ($T_2$) of the second polarizing plate is larger than a light transmittance ($T_1$) of the first polarizing plate. Such a liquid crystal panel is characterized in that a contrast ratio in a front direction is remarkably higher, compared with that of a conventional liquid crystal panel (in which, typically, the light transmittances of two polarizing plates placed on both sides of a liquid crystal cell are the same). Thus, the inventors of the present invention found for the first time that the contrast ratio in a front direction is largely enhanced, using two polarizing plates with a light transmittance adjusted on both sides of a liquid crystal cell, which is unexpected excellent effect.

The liquid crystal panel is preferably of a normally black mode. As used in the specification of the present invention, the "normally black mode" refers to a liquid crystal panel designed so that the light transmittance becomes minimum (state where screen becomes black) under no voltage application, and the light transmittance increases under voltage application. The effect of enhancing a contrast ratio in a front direction is particularly remarkable in a liquid crystal panel of a normally black mode, which performs a black display under no voltage application. The reason for this is considered that the effect obtained by using two polarizing plates with different light transmittances is prevented from being impaired by driven liquid crystal molecules.

A difference ($\Delta T = T_2 - T_1$) between the light transmittance ($T_2$) of the second polarizing plate and the light transmittance ($T_1$) of the first polarizing plate is preferably 0.1% to 6.0%, more preferably 0.1% to 5.0%, particularly preferably 0.2% to 4.5%, and most preferably 0.3% to 4.2%. By using two polarizing plates having a difference in light transmittance in the above range, the liquid crystal panel of the present invention can provide a liquid crystal display apparatus with a high contrast ratio in a front direction.

FIGS. 1(a) and 1(b) are each schematic cross-sectional view of a liquid crystal panel of the present invention. It should be noted that the ratio of dimensions in longitudinal, lateral, and thickness directions in FIGS. 1(a) and 1(b) are different from the actual one for ease of observation. In one embodiment, a liquid crystal panel 100 shown in FIG. 1(a) includes a liquid crystal cell 10, a first polarizing plate 21 placed on a viewer side of the liquid crystal cell 10, and a second polarizing plate 22 placed on an opposite side of the liquid crystal cell 10 with respect to the viewer side. In another embodiment, a liquid crystal panel 100 shown in FIG. 1(b) includes a liquid crystal cell 10, a first polarizing plate 21 placed on a viewer side of the liquid crystal cell 10, a second polarizing plate 22 placed on an opposite side of the liquid crystal cell 10 with respect to the viewer side, and a brightness enhancing film 30 placed on an opposite side of the second polarizing plate 22 with respect to the liquid crystal cell 10 side. Practically, any appropriate adhesion layer (not shown) is placed between the liquid crystal cell 10 and the first polarizing plate 21, and between the liquid crystal cell 10 and the second polarizing plate 22.

Any appropriate layer can be placed between respective constituent members of the above liquid crystal panel. For example, any appropriate retardation film can be placed between the first polarizing plate 21 and/or the second polarizing plate 22, and the liquid crystal cell 10. In the case where the retardation film is used, as the relation between a slow axis of the retardation film and an absorption axis of a polarizing plate adjacent to the retardation film, any appropriate positional relationship can be selected depending upon the driving mode of the liquid crystal cell.

<B. Liquid Crystal Cell>

As a liquid crystal cell used in the present invention, any appropriate cell can be adopted. Examples of the liquid crystal cell include an active matrix type using a thin film transistor and a simple matrix type represented by a supertwisted nematic liquid crystal display apparatus.

The liquid crystal cell preferably includes a pair of substrates and a liquid crystal layer as a display medium interposed between the pair of substrates. On one substrate (active matrix substrate), switching elements (typically, TFTs) for controlling electrooptical properties of liquid crystal, scanning lines for providing the switching elements with a gate signal, and signal lines for providing the switching elements with a source signal are placed. On the other substrate (color filter substrate), a color filter is provided. The color filter may be provided on the above active matrix substrate. Alternatively, in the case where a light source of three colors RGB is used for illumination means of a liquid crystal display apparatus as in a field sequential system, the above color filter may be omitted. The interval between two substrates is controlled with spacers. On a side of each substrate, which is in contact with the liquid crystal layer, an alignment film made of polyimide, for example, is provided.

The liquid crystal cell preferably includes a liquid crystal layer containing liquid crystal molecules arranged in a homogeneous alignment in the absence of an electric field. Herein, the "homogeneous alignment" refers to the state in which an alignment vector of the liquid crystal molecules is aligned uniformly in parallel with respect to the substrate plane as a result of the interaction between the substrate subjected to alignment treatment and liquid crystal molecules. As used in the specification of the present invention, the homogeneous alignment also includes the case where the liquid crystal molecules tilt slightly with respect to the substrate plane, i.e., the case where the liquid crystal molecules have a pretilt angle. The pretilt angle is generally 10° or less.

A liquid crystal cell having a liquid crystal layer containing liquid crystal molecules arranged in a homogeneous alignment in the absence of an electric field typically has a relationship of a refractive index ellipsoid of nx>ny=nz. Herein, ny=nz includes the case where ny and nz are substantially the same, as well as the case where they are completely the same. Typical examples of the above liquid crystal cell include an in-plane switching (IPS) mode, a fringe field switching (FFS) mode, and a ferroelectric liquid crystal (FLC) mode, according to the classification based on a driving mode.

In the case where the liquid crystal cell has a liquid crystal layer containing liquid crystal molecules arranged in a homogeneous alignment in the absence of an electric field, the liquid crystal panel of the present invention may be a so-called O-mode or a so-called E-mode. The liquid crystal panel is preferably an E-mode. By setting the liquid crystal panel to be the E-mode, a liquid crystal display apparatus with a much higher contrast ratio in a front direction can be obtained. The "O-mode liquid crystal panel" refers to a liquid crystal panel in which the direction of an absorption axis of a polarizer placed on an opposite side (typically, a backlight side) of a liquid crystal cell with respect to a viewer side and the direction of an initial alignment direction (the direction in which the refractive index in a plane of a liquid crystal cell is largest in the absence of an electric field) of a liquid crystal cell are substantially parallel to each other. The "E-mode liquid crystal panel" refers to a liquid crystal panel in which the direction of an absorption axis of a polarizer placed on an opposite side (typically a backlight side) of a liquid crystal cell with respect to a viewer side and the direction of initial alignment of the liquid crystal cell are substantially perpendicular to each other.

The IPS mode and the FFS mode may each employ a V-shaped electrode, a zigzag electrode, or the like. Examples of a commercially available liquid crystal display apparatus employing the liquid crystal cell having the relationship of a refractive index ellipsoid of nx>ny=nz include: 20V-inch wide liquid crystal television "Wooo" (trade name) manufactured by Hitachi, Ltd.; 19-inch liquid crystal display "ProLite E481S-1" (trade name) manufactured by Iiyama Corporation; 17-inch TFT liquid crystal display "FlexScan L565" (trade name) manufactured by Eizo Nanao Corporation; and Tablet PC "M1400" (trade name) manufactured by Motion Computing, Inc.

<C. Polarizing Plate>

As the polarizing plates (the first polarizing plate and the second polarizing plate) used in the present invention, any appropriate one can be adopted, as long as the light transmittance thereof satisfies the above relationship. As used in the specification of the present invention, a "polarizing plate" refers to the one which converts natural light or polarized light into linearly polarized light. Preferably, the polarizing plate has a function of separating incident light into two polarization components perpendicular to each other, transmitting one polarization component, and absorbing, reflecting, and/or scattering the other polarization component.

The thickness of the polarizing plate is not particularly limited, and includes the general concept of a thin film, a film, and a sheet. The thickness of the polarizing plate is preferably 1 μm to 250 μm, and more preferably 20 μm to 250 μm. By setting the thickness of the polarizing plate in the above range, the polarizing plate having excellent mechanical strength can be obtained.

The polarizing plate may be composed of a single layer (which is also referred to as polarizer) having a polarization function, or may be composed of a laminate having a plurality of layers. In the case where the polarizing plate is a laminate, representative examples of the layered configuration include: (a) a laminate (e.g., a configuration of Examples) including a polarizer and a protective layer; (b) a laminate including a polarizer, a protective layer, and a surface treatment layer; and (c) a laminate including two or more layers of polarizer. The polarizing plate may have two or more surface treatment layers. Alternatively, in the polarizing plate, the protective layer may also have a function of enlarging the viewing angle of a liquid crystal cell (layer having such a function will be referred to as an optical compensation layer).

The light transmittance ($T_1$) of the first polarizing plate is preferably 38.3% to 43.3%, more preferably 38.6% to 43.2%, particularly preferably 38.9% to 43.1%, and most preferably 39.2% to 43.0%. By setting $T_1$ in the above range, a liquid crystal display apparatus with much higher contrast ratio in a front direction can be obtained.

The light transmittance ($T_2$) of the second polarizing plate is preferably 41.1% to 44.3%, more preferably 41.5% to 44.3%, particularly preferably 41.9% to 44.2%, and most preferably 42.3% to 44.2%. By setting $T_2$ in the above range, a liquid crystal display apparatus with much higher contrast ratio in a front direction can be obtained.

The liquid crystal panel of the present invention can be produced, for example, by selecting commercially available polarizing plates having different light transmittances, and appropriately combining them. Preferably, the liquid crystal panel of the present invention can be manufactured by appropriately adjusting the light transmittances of the polarizing plates so that the contrast ratio in a front direction becomes high in accordance with the driving mode of a liquid crystal cell, the application, and the like.

As a method of increasing or decreasing the light transmittance of the polarizing plate, for example, in the case where a polarizer containing as a main component a polyvinyl alcohol-based resin containing iodine is used for the polarizing plate, there is a method of adjusting the content of iodine in the polarizer. Specifically, when the content of iodine in the polarizer is increased, the light transmittance of the polarizing plate can be decreased, and when the content of iodine in the polarizer is decreased, the light transmittance of the polarizing plate can be increased. This method can be applied to the production of a sheet-shaped polarizing plate as well as the production of a roll-shaped polarizing plate. The details of the polarizer will be described later.

A degree of polarization (P) of the first polarizing plate and/or the second polarizing plate is preferably 99% or more, more preferably 99.5% or more, and still more preferably 99.8%. By setting the degree of polarization (P) in the above range, a liquid crystal display apparatus with a higher contrast ratio in a front direction can be obtained.

The hue under the National Bureau of Standards (NBS) of the first polarizing plate and/or the second polarizing plate; a-value (simplex a-value) is preferably −2.0 or more, and more preferably −1.8 or more. The ideal a-value is 0. The hue under the National Bureau of Standards (NBS) of the polarizing plate; b-value (simplex b-value) is preferably 4.2 or less, and more preferably 4.0 or less. The ideal b-value is 0. By setting the a-value and the b-value of the polarizing plate close to 0, a liquid crystal display apparatus providing a display image with vivid color can be obtained.

The degree of polarization and the hue can be measured by using a spectrophotometer "DOT-3" (trade name) manufactured by Murakami Color Research Laboratory. Specifically, the degree of polarization can be determined by: measuring a parallel light transmittance ($H_0$) and a perpendicular light transmittance ($H_{90}$) of the polarizing plate; and using the following equation: degree of polarization (%)=$\{(H_0-H_{90})/(H_0+H_{90})\}^{1/2} \times 100$. The parallel light transmittance ($H_0$) refers to a value of light transmittance of a parallel laminate polarizing plate manufactured by piling two identical polarizing plates such that their absorption axes are parallel to each other. The perpendicular light transmittance ($H_{90}$) refers to a value of light transmittance of a perpendicular laminate polarizing plate manufactured by piling two identical polarizers such that their absorption axes are perpendicular to each other. These light transmittances refer to a Y value obtained through visibility correction by a two-degree field of view (C light source) in accordance with JIS Z 8701-1982.

<C-1. Polarizer>

As the polarizer used in the present invention, any appropriate polarizer can be adopted. Preferably, the first polarizing plate includes a first polarizer, the second polarizing plate includes a second polarizer, and the first polarizer and the second polarizer respectively contain as a main component an iodine-containing a polyvinyl alcohol-based resin. The polarizer can be obtained by stretching a polymer film containing as a main component an iodine-containing polyvinyl alcohol-based resin. The polarizing plate including such a polarizer has excellent optical properties.

The relationship between an iodine content ($I_1$) of the first polarizer and an iodine content ($I_2$) of the second polarizing plate is preferably $I_1 > I_2$. A difference ($\Delta I = I_1 - I_2$) between the iodine content ($I_1$) of the first polarizer and the iodine content ($I_2$) of the second polarizing plate is preferably 0.1% by weight to 1.9% by weight, more preferably 0.2% by weight to 1.9% by weight, particularly preferably 0.4% by weight to 1.8% by weight, and most preferably 0.6% by weight to 1.7% by weight. By setting the relationship of iodine contents of the respective polarizers in the above range, a polarizing plate having a relationship of a light transmittance in a preferred range is obtained, and as a result, a liquid crystal display apparatus with a high contrast ratio in a front direction can be obtained.

The iodine content of the first polarizer and/or the second polarizer is preferably 2.0% by weight to 5.0% by weight, and more preferably 2.0% by weight to 4.0% by weight. The iodine content of the above first polarizer is preferably 2.3% by weight to 5.0% by weight, more preferably 2.5% by weight to 4.5% by weight, and particularly preferably 2.7% by weight to 4.0% by weight. The iodine content of the second polarizer is preferably 2.0% by weight to 3.5% by weight, more preferably 2.0% by weight to 3.2% by weight, and particularly preferably 2.0% by weight to 2.9% by weight. By setting the iodine content of each polarizer in the above range, a polarizing plate having a light transmittance in a preferred range is obtained, and as a result, a liquid crystal display apparatus with a high contrast ratio in a front direction can be obtained.

Preferably, the first polarizer and/or the second polarizer further contain potassium. The potassium content is preferably 0.2% by weight to 1.0% by weight, more preferably 0.3% by weight to 0.9% by weight, and particularly preferably 0.4% by weight to 0.8% by weight. By setting the potassium content in the above range, a polarizing plate having a light transmittance in a preferred range and a high degree of polarization can be obtained.

Preferably, the above first polarizer and/or the above second polarizer further contain boron. The boron content is preferably 0.5% by weight to 3.0% by weight, more preferably 1.0% by weight to 2.8% by weight, and particularly preferably 1.5% by weight to 2.6% by weight. By setting the boron content in the above range, a polarizing plate having a light transmittance in a preferred range and a high degree of polarization can be obtained.

The polyvinyl alcohol-based resin can be obtained by saponifying a vinyl ester-based polymer obtained by polymerizing a vinyl ester-based monomer. The saponification degree of the polyvinyl alcohol-based resin is preferably 95.0 mol % to 99.9 mol %. The saponification degree can be obtained in accordance with JIS K 6726-1994. By using a polyvinyl alcohol-based resin having a saponification degree in the above range, a polarizer having excellent durability can be obtained.

The polyvinyl alcohol-based resin may have any appropriate average degree of polymerization depending on the purpose. The average degree of polymerization is preferably 1,200 to 3,600. The average degree of polymerization can be determined in accordance with JIS K 6726-1994.

As a method of obtaining a polymer film containing as a main component the polyvinyl alcohol-based resin, any appropriate forming method can be adopted. An example of the forming method includes a method described in Example 1 of JP 2000-315144 A.

A polymer film containing as a main component the polyvinyl alcohol-based resin preferably contains a plasticizer and/or a surfactant. Examples of the plasticizer include polyhydric alcohol such as ethylene glycol and glycerine. The polyhydric alcohol is used for the purpose of further enhancing the colorability and stretchability of a polarizer. An example of the surfactant includes a nonionic surfactant. The surfactant is used for the purpose of further enhancing the colorability and stretchability of a polarizer.

As the polymer film containing as a main component the polyvinyl alcohol-based resin, a commercially available film can be used as it is. Specific examples of the commercially available polymer film containing as a main component a polyvinyl alcohol-based resin include "Kuraray Vinylone Film" (trade name) manufactured by Kuraray Co., Ltd., "Tohcello Vinylone Film" (trade name) manufactured by Tohcello Co., Ltd., and "Nichigo Vinylone Film" (trade name) manufactured by The Nippon Synthetic Chemical Industry, Co., Ltd.

Figure 2:
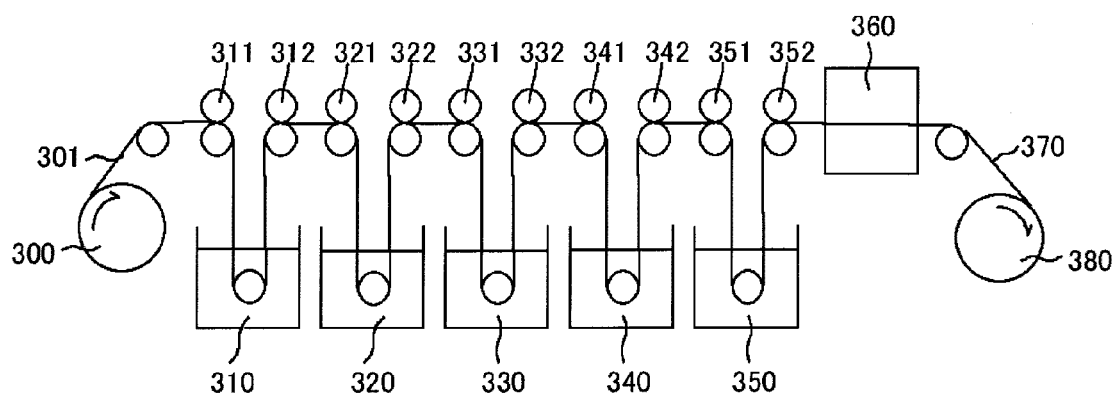
FIG. 2 Schematic diagram illustrating a concept of a typical production process of a polarizer used in the present invention.

An example of a method of producing a polarizer will be described by referring to FIG. 2. FIG. 2 is a schematic diagram illustrating a concept of a typical production process of a polarizer used in the present invention. For example, a polymer film 301 containing as a main component a polyvinyl alcohol-based resin is fed from a feed roller 300, immersed in a swelling bath containing pure water 310 and a coloring bath containing iodine solution 320, so as to be subjected to swelling treatment and coloring treatment under tension in a longitudinal direction of the film by rollers 311, 312, 321, and 322 at different speed ratios. Potassium iodide may be added in the coloring bath. Next, the swelled and colored film is immersed in a first cross-linking bath 330 and a second cross-linking bath 340 containing potassium iodide, so as to be subjected to cross-linking treatment and final stretching treatment under tension in a longitudinal direction of the film by rollers 331, 332, 341, and 342 at different speed ratios. Boric acid may be added in the first cross-linking bath and/or the second cross-linking bath. The cross-linked film is immersed in a water washing bath containing pure water 350 by rollers 351 and 352, so as to be subjected to water-washing treatment. The water-washed film is dried by drying means 360 to adjust its moisture content to 10% to 30%, for example, and taken up in a take-up part 380. The polarizer 370 can be obtained by stretching the polymer film containing as a main component a polyvinyl alcohol-based resin so as to be 5 to 7 times longer than the original length through the above processes.

In the coloring process, the addition amount of iodine in the coloring bath is preferably 0.01 part by weight to 0.15 parts by weight, and more preferably 0.01 part by weight to 0.05 parts by weight with respect to 100 parts by weight of water. By setting the addition amount of iodine in a coloring bath in the above range, a polarizing plate having excellent optical properties can be obtained. When the addition amount of iodine in a coloring bath is increased in the above range, a polarizing plate having a low light transmittance can be obtained. Further, when the addition amount of iodine in a coloring bath is decreased in the above range, a polarizing plate having a high light transmittance can be obtained.

The addition amount of potassium iodide in the coloring bath is preferably 0.05 parts by weight to 0.5 parts by weight, and more preferably 0.1 part by weight to 0.3 parts by weight with respect to 100 parts by weight of water. By setting the addition amount of potassium iodide in the above range, a polarizing plate having excellent optical properties, a light transmittance in a preferred range, and a high degree of polarization, can be obtained.

In the cross-linking process, the addition amount of potassium iodide in the first cross-linking bath and the second cross-linking bath is preferably 0.5 parts by weight to 10 parts by weight, and more preferably 1 part by weight to 7 parts by weight with respect to 100 parts by weight of water. The addition amount of boric acid in the first cross-linking bath and the second cross-linking bath is preferably 0.5 parts by weight to 10 parts by weight, and more preferably 1 part by weight to 7 parts by weight. By setting the addition amount of potassium iodide and boric acid in the above range, a polarizing plate having excellent optical properties, a light transmittance in a preferred range and a high degree of polarization, can be obtained.

<C-2. Protective Layer>

A polarizing plate used in the present invention preferably includes a polarizer, and a protective layer placed on both sides of the polarizer. The protective layer can, for example, prevent the polarizer from shrinking or expanding, and prevent the polarizer from being degraded due to UV-light, whereby a polarizing plate having high durability can be obtained.

In one embodiment, a first polarizing plate used in the present invention preferably includes a first polarizer, a first protective layer placed on a liquid crystal cell side of the first polarizer, and a second protective layer placed on an opposite side of the first polarizer with respect to the liquid crystal cell side. Further, a second polarizing plate preferably includes a second polarizer, a third protective layer placed on the liquid crystal cell side of the second polarizer, and a fourth protective layer placed on an opposite side of the second polarizer with respect to the liquid crystal cell side.

The protective layer and the polarizer can be laminated via any appropriate adhesion layer. In the specification of the present invention, the "adhesion layer" refers to a layer that connects the surfaces of adjacent optical members, thereby integrating them with a practically sufficient adhesion strength and adhesion time. Examples of a material forming the adhesion layer include an adhesive and an anchor coat agent. The adhesion layer may have a multi-layered structure, for example, in which an anchor coat layer is formed on the surface of an adherend and an adhesive layer is formed thereon, or may be a thin layer (which may also be referred to as a hair line) that cannot be recognized by the naked eye.

If the polarizer contains as a main component an iodine-containing polyvinyl alcohol-based resin, a material forming the adhesion layer is preferably a water-soluble adhesive. The water-soluble adhesive is preferably a water-soluble adhesive containing as a main component a polyvinyl alcohol-based resin. As the adhesion layer, a commercially available adhesive can be used as it is, or, the commercially available adhesive mixed with a solvent or an additive can also be used. An example of the commercially available water-soluble adhesive containing as a main component a polyvinyl alcohol-based resin includes "GOHSEFIMER Z200" (trade name) manufactured by Nippon Synthetic Chemical Industry, Co., Ltd.

The water-soluble adhesive may further contain a cross-linking agent as an additive. Examples of the kind of cross-linking agent include an amine compound, an aldehyde compound, a methylol compound, an epoxy compound, an isocyanate compound, and a polyvalent metal salt. A commercially available product may be used as it is as the cross-linking agent. An example of the commercially available cross-linking agent includes an aldehyde compound "Glyoxal" (trade name) manufactured by Nippon Synthetic Chemical Industry Co., Ltd. The addition amount of the cross-linking agent can be appropriately adjusted depending upon the purpose. However, the addition amount is generally more than 0 and 10 parts by weight or less with respect to 100 parts by weight of a solid content of a water-soluble adhesive.

[First Protective Layer]

A first protective layer is placed on a liquid crystal cell side of the first polarizer. The thickness of the first protective layer can be selected appropriately depending upon the purpose. The thickness of the protective layer is preferably 20 µm to 100 µm. By setting the thickness of the first protective layer in the above range, a polarizing plate having excellent mechanical strength and durability can be obtained.

The light transmittance of the first protective layer, measured with light having a wavelength of 590 nm at 23° C., is preferably 90% or more, and the practical upper limit of the light transmittance is 96%.

The absolute value of a photoelastic coefficient (C[590] ($m^2/N$)) of the first protective layer is preferably $1\times10^{-12}$ to $100\times10^{-12}$, and more preferably $1\times10^{-12}$ to $60\times10^{-12}$. By using a first protective layer having the absolute value of the photoelastic coefficient in the above range, a polarizing plate in which optical unevenness is unlikely to occur due to distortion can be obtained.

The first protective layer is placed between the polarizer and the liquid crystal cell, so the optical properties thereof may influence the display characteristics of the liquid crystal display apparatus. Thus, it is preferred that the first protective layer have an appropriate retardation value.

Preferably, the first protective layer exhibits substantially optical isotropy. Herein, "exhibiting substantially optical isotropy" refers to that Re[590] is less than 10 nm, and an absolute value of a thickness direction retardation value (|Rth[590]|) is less than 10 nm.

The Re[590] of the first protective layer is preferably less than 10 nm, more preferably 8 nm or less, and particularly preferably 5 nm or less. By setting the Re[590] in the above range, a liquid crystal display apparatus with an extremely small color shift in an oblique direction can be obtained.

The absolute value of Rth[590] of the first protective layer (|Rth[590]|) is preferably less than 10 nm, more preferably 8 nm or less, and particularly preferably 5 nm or less. By setting

|Rth[590]| in the above range, a liquid crystal display apparatus with an extremely small color shift in an oblique direction can be obtained.

As a material for forming the first protective layer, any appropriate material can be adopted. Preferably, the first protective layer is a polymer film containing cellulose-based resin. The cellulose-based resin has excellent adhesion with the polarizer. Therefore, a polarizing plate can be obtained in which floating and peeling do not occur between the polarizer and the protective layer even in a high-temperature and high-humidity environment.

As the cellulose-based resin, any appropriate resin can be adopted. The cellulose-based resin is preferably a cellulose organic acid ester or a cellulose-mixed organic acid ester in which a part or an entirety of a hydroxyl group of cellulose is replaced by an acetyl group, a propionyl group and/or a butyloyl group. Specific examples of the cellulose organic acid ester include cellulose acetate, cellulose propionate, and cellulose butyrate. Specific examples of the cellulose-mixed organic acid ester include cellulose acetate propionate and cellulose acetate butyrate. The cellulose-based resin is produced, for example, by a method described in paragraphs [0040] and [0041] of JP 2001-188128 A.

Regarding the weight average molecular weight (Mw) of the cellulose-based resin, a value measured by a gel permeation chromatograph (GPC) method with a tetrahydrofuran solvent is preferably 20,000 to 1,000,000, and more preferably 25,000 to 800,000. The weight average molecular weight is a value measured by a method described in the Examples. If the weight average molecular weight is in the above range, the first protective layer having excellent mechanical strength, and having satisfactory solubility, formability, and operability of flow-casting can be obtained.

A glass transition temperature (Tg) of the cellulose-based resin is preferably 110 to 185° C. Tg of 110° C. or higher facilitates formation of a polymer film with favorable thermal stability, and Tg of 185° C. or lower has excellent forming processability. The glass transition temperature (Tg) can be determined by DSC method mentioned in accordance with JIS K 7121.

As a method of obtaining the polymer film containing the cellulose-based resin, any appropriate forming method can be employed. Examples of the forming method include compression molding, transfer molding, injection molding, extrusion molding, blow molding, powder molding, FRP molding, and solvent casting. Among them, solvent casting is preferred. This is because a polymer film having excellent smoothness and optical uniformity can be obtained.

The above solvent casting method is specifically a method of defoaming a concentrated solution (dope) in which a resin composition containing a resin as a main component, an additive, and the like are dissolved, flow-casting the resultant solution uniformly in a sheet shape on the surface of an endless stainless belt or a rotation drum, and evaporating the solvent to form a film. As the condition adopted during film formation, any appropriate condition can be selected depending upon the purpose.

The polymer film containing the cellulose-based resin can further contain any appropriate additive. Specific examples of the additive include a plasticizer, a thermal stabilizer, a light stabilizer, a lubricant, an antioxidant, a UV absorber, a flame retardant, a colorant, an antistatic agent, a compatibilizing agent, a cross-linking agent, and a thickener. The content (weight ratio) of the additive may be appropriately set in accordance with the purpose. The content (weight ratio) of the additive is preferably more than 0 and 20 or less with respect to 100 parts by weight of the cellulose-based resin.

As the first protective layer, a commercially available film can be used as it is. Alternatively, a commercially available film subjected to secondary treatment such as stretching treatment and/or shrinking treatment can be used. Examples of the commercially available polymer film containing a cellulose-based resin include FUJITAC series (ZRF80S, TD80UF, TDY-80UL (trade name)) manufactured by Fuji Photo Film Co., Ltd. and "KC8UX2M" (trade name) manufactured by Konica Minolta Opto, Inc.

[Second Protective Layer]

A second protective layer is placed on an opposite side of the first polarizer with respect to the liquid crystal cell side. As the second protective layer, any appropriate layer can be used. Preferably, a layer having a thickness, a light transmittance, and absolute values of a photoelastic coefficient in the ranges described above can be used.

As a material for forming the second protective layer, any appropriate material can be adopted. Preferably, the second protective layer is a polymer film containing a cellulose-based resin. As the polymer film containing a cellulose-based resin, preferably films similar to those described above can be used.

The second protective layer may be subjected to any appropriate surface treatment, as long as the above relationship of a light transmittance is satisfied. For example, as the protective layer, a commercially available polymer film subjected to surface treatment can be used as it is. Alternatively, a commercially available polymer film may be subjected to any surface treatment. Examples of the surface treatment include diffusion treatment (anti-glare treatment), reflection preventing treatment (anti-reflection treatment), hard coat treatment, and antistatic treatment. Examples of the commercially available diffusion treatment (anti-glare treatment) product include AG150, AGS1, AGS2, and AGT1 manufactured by Nitto Denko Corporation. Examples of the commercially available reflection preventing treatment (anti-reflection treatment) product include ARS and ARC manufactured by Nitto Denko Corporation. Examples of the commercially available film subjected to hard coat treatment and antistatic treatment include "KC8UX-HA" (trade name) manufactured by Konica Minolta Opto, Inc.

[Surface Treatment Layer]

If required, a surface treatment layer may be provided on an opposite side of the second protective layer with respect to a side having the first polarizer. As the surface treatment layer, any appropriate layer can be adopted depending upon the purpose. Examples of the surface treatment layer include a diffusion treatment (anti-glare treatment) layer, a reflection preventing treatment (anti-reflection treatment) layer, a hard coat treatment layer, and an antistatic treatment layer. These surface treatment layers are used for the purpose of preventing a screen from being contaminated or damaged, and preventing a display image from becoming difficult to see due to the incidence of light of a fluorescent lamp in a room or sunlight. As the surface treatment layer, a base film with a treatment agent for forming the treatment layer bonded to the surface thereof is generally used. The base film may function as the second protective layer. Further, the surface treatment layer may have a multi-layered structure, for example, in which a hard coat treatment layer is laminated on an antistatic treatment layer. Examples of the commercially available surface treatment layer subjected to reflection preventing treatment include ReaLook series manufactured by NOF CORPORATION.

[Third Protective Layer]

A third protective layer is placed on a liquid crystal cell side of the second polarizer. For the third protective layer, any appropriate materials, properties, conditions, and the like described with respect to the first protective layer can be adopted. The first protective layer and the third protective layer may be identical to or different from each other. Preferably, the third protective layer exhibits substantially optical isotropy.

[Fourth Protective Layer]

A fourth protective layer is placed on an opposite side of the second polarizer with respect to the liquid crystal cell side. For the fourth protective layer, any appropriate materials, properties, conditions, and the like described with respect to the second protective layer can be adopted. The second protective layer and the fourth protective layer may be identical to or different from each other.

<D. Adhesion Layer>

In a preferred embodiment, the polarizing plates (first polarizing plate and second polarizing plate) are attached to the liquid crystal panel via an adhesion layer. As a material for forming the adhesion layer, an appropriate adhesive and/or an anchor coat agent can be selected depending upon the kind and application of an adherend. According to the classification based on the form, specific examples of the adhesive include a solvent-type adhesive, an emulsion-type adhesive, a pressure-sensitive adhesive, a rewetting adhesive, a polycondensation adhesive, a non-solvent-type adhesive, a film-shaped adhesive, and a hot melt-type adhesive. According to the classification based on the chemical structure, specific examples of the adhesive include a synthetic resin adhesive, a rubber-based adhesive, and a natural adhesive. The adhesive contains a viscoelastic material (which may be referred to as a pressure-sensitive adhesive) exhibiting adhesive strength detectable by contact under pressure at room temperature.

Preferably, a material for forming the adhesion layer is a pressure-sensitive adhesive (which may also be referred to as an acrylic pressure-sensitive adhesive) containing an acrylic polymer as a base polymer. This is because such a material has excellent transparency, adhesion, weather resistance, and heat resistance. The thickness of the acrylic pressure-sensitive layer can be adjusted appropriately depending upon the material and application of an adherend, and is generally 5 μm to 50 μm.

<E. Brightness Enhancing Film>

Referring to FIG. 1(b), the liquid crystal panel 100 further includes a brightness enhancing film 30 on an opposite side of the second polarizing plate 22 with respect to the liquid crystal cell 10 side. Practically, an adhesion layer can be placed between the second polarizing plate 22 and the brightness enhancing film 30 for the purpose of attaching them to each other. In the specification of the present invention, the "brightness enhancing film" has a function of separating incident light into two perpendicular polarization components, and transmitting one polarization component and reflecting the other polarization component.

The brightness enhancing film is used for enhancing a brightness (white brightness) in the case where a white image is displayed on a liquid crystal display apparatus. However there is a problem in that, although a conventional liquid crystal panel can increase a white brightness by using a brightness enhancing film, a brightness (black brightness) in the case where a black image is displayed increases simultaneously, which makes it impossible to obtain a high contrast ratio in a front direction. The liquid crystal panel with a configuration of the present invention can minimize the increase in a black brightness while increasing a white brightness, so a high contrast ratio in a front direction can be obtained.

Preferably, the brightness enhancing film is a laminate including a thermoplastic resin layer (A) and a thermoplastic resin layer (B). Typically, the brightness enhancing film includes the thermoplastic resin layer (A) and the thermoplastic resin layer (B) arranged alternately (ABABAB . . . ). The number of layers constituting the brightness enhancing film is preferably 2 to 20, and more preferably 2 to 15. The brightness enhancing film having such a configuration is produced by co-extruding two kinds of resins and stretching an extruded film, for example. The total thickness of the brightness enhancing film is preferably 20 μm to 800 μm.

Preferably, the thermoplastic resin layer (A) exhibits optical anisotropy. The in-plane birefringence ($\Delta n_A$) of the thermoplastic resin (A) is preferably 0.05 or more, more preferably 0.1 or more, and particularly preferably 0.15 or more. In terms of the optical uniformity, the upper limit value of the $\Delta n_A$ is preferably 0.2. Herein, the $\Delta n_A$ represents a difference ($nx_A-ny_A$) between $nx_A$ (refractive index in a slow axis direction) and $ny_A$ (refractive index in a fast axis direction).

It is preferred that the thermoplastic resin layer (B) exhibits substantially optical isotropy. The in-plane birefringence ($\Delta n_B$) of the thermoplastic resin (B) is preferably $5\times10^{-4}$ or less, more preferably $1\times10^{-4}$ or less, and particularly preferably $0.5\times10^{-4}$ or less. The lower limit value of the $\Delta n_B$ is preferably $0.01\times10^{-4}$. Herein, the $\Delta n_B$ represents a difference ($nx_B-ny_B$) between $nx_B$ (refractive index in a slow axis direction) and $ny_B$ (refractive index in a fast axis direction).

It is preferred that $ny_A$ of the thermoplastic resin layer (A) and $ny_B$ of the thermoplastic resin layer (B) are substantially the same. The absolute value of the difference between $ny_A$ and $ny_B$ is preferably $5\times10^{-4}$ or less, more preferably $1\times10^{-4}$ or less, and particularly preferably $0.5\times10^{-4}$ or less. A brightness enhancing film having such optical properties is excellent in a function of reflecting a polarization component.

As the resin forming thermoplastic resin layer (A), any appropriate resin can be selected. The thermoplastic resin layer (A) preferably contains a polyethylene terephthalate-based resin, polytrimethylene terephthalate-based resin, a polybutyrene terephthalate-based resin, a polyethylene naphthalate-based resin, a polybutylene naphthalate-based resin, and a mixture thereof. These resins are excellent in expression of birefringence by stretching and are also excellent in stability of birefringence after stretching.

As the thermoplastic resin layer (B), any appropriate resin can be selected. The thermoplastic resin layer (B) preferably contains a polystyrene-based resin, a polymethylmethacrylate-based resin, a polystyrene glycidyl methacrylate-based resin, or a mixture thereof. A halogen group such as chlorine, bromine, and iodine may be introduced in the resin so as to increase a refractive index. Alternatively, the resin can contain any appropriate additive so as to adjust a refractive index.

As the brightness enhancing film, a commercially available film can be used as it is. Examples of the commercially available brightness enhancing film include NIPOCS PCF series manufactured by Nitto Denko Corporation and Vicuiti DBFE series manufactured by Sumitomo 3M Ltd.

<F. Liquid Crystal Display Apparatus>

Figure 3:
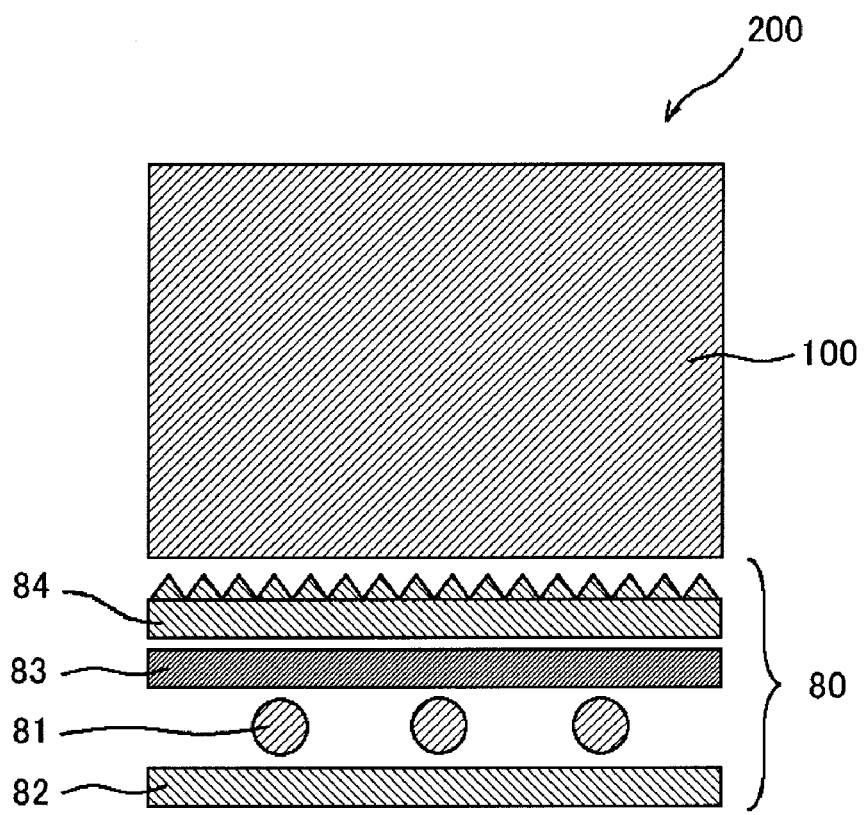
FIG. 3 Schematic cross-sectional view of a liquid crystal display apparatus according to a preferred embodiment of the present invention.

The liquid crystal display apparatus of the present invention includes the above liquid crystal panel. FIG. 3 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 3 is different from the actual one. A liquid crystal display apparatus 200 at least includes a liquid crystal panel 100 and a backlight unit 80 placed on one side of the liquid crystal panel 100. In the illustrated example, the case where a backlight unit of a direct-type is adopted has been shown. However, for example, a sidelight-type may be used.

In the case where a direct-type is adopted, the backlight unit 80 preferably includes a light source 81, a reflective film 82, a diffusion plate 83, and a prism sheet 84. In the case where the sidelight-type is adopted, the backlight unit preferably further includes a light guide plate and a light reflector. As long as the effects of the present invention are obtained, a part of the optical member illustrated in FIG. 3 may be omitted or may be replaced by another optical element, depending upon the application such as an illumination system of a liquid crystal display apparatus and a driving mode of a liquid crystal cell.

The liquid crystal display apparatus may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type.

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

Preferably, the liquid crystal display apparatus of the present invention is applied to a television. The screen size of the television is preferably wide 17-type (373 mm×224 mm) or more, more preferably wide 23-type (499 mm×300 mm) or more, and particularly preferably wide 32-type (687 mm×412 mm) or more.

EXAMPLES

The present invention will be described in more detail by using the following examples and comparative examples. However, the present invention is not limited to the examples. Analytical methods used in the examples are described below.

(1) Light Transmittance of Polarizing Plate:

A light transmittance (T) is a Y-value obtained through a visibility correction by a two-degree field of view (C light source) in accordance with JIS Z 8701-1982.

(2) Method of Measuring Content of Each Element (I, K):

The content of each element was obtained from an X-ray intensity obtained by measuring a circular sample with a diameter of 10 mm by an X-ray fluorescence analysis under the following conditions, using a calibration curve formed previously using a standard sample.

Analyzer: an X-ray fluorescence spectrometer (XRF) "ZSX100e" (trade name) manufactured by Rigaku Corporation.

Anticathode: rhodium
Dispersive crystal: lithium fluoride
Excited light energy: 40 kV-90 mA
Iodine measurement line: I-LA
Potassium measurement line: K-KA
Quantification method: FP method
2θ angle peak: 103.078 deg(iodine), 136.847 deg(potassium)
Measurement time: 40 seconds (3) Method of Measuring Refractive Index (n[550]):

The refractive index was obtained by using an Abbe refractometer "DR-M4" (trade name, manufactured by Atago Co., Ltd.) by using light with a wavelength of 589 nm at 23° C.

(4) Method of Measuring in-Plane and Thickness Direction Retardation Values (Re[λ], Rth[λ]):

The retardation values were measured by using an automatic birefringence analyzer "KOBRA-21ADH" (trade name) manufactured by Oji Scientific Instruments at 23° C.

(5) Method of Measuring Molecular Weight

The molecular weight was calculated using polystyrene as a standard sample by gel permeation chromatography (GPC). Specifically, the molecular weight was measured by the following apparatus and appliance under the following measurement conditions.

Measurement sample: a filtrate was used, which was obtained by dissolving the obtained sample in tetrahydrofuran to obtain a 0.1% by weight of solution, allowing the solution to stand still overnight, and filtering the solution with a membrane filter of 0.45 μm.

Analysis apparatus: "HLC-8120GPC" manufactured by Tosoh Corporation
Column: TSKgel SuperHM-H/H4000/H3000/H2000
Column size: each 6.0 mm I.D.×150 mm
Eluate: tetrahydrofuran
Flow rate: 0.6 ml/minute
Detector: RI
Column temperature: 40° C.
Injection amount: 20

(6) Method of Measuring Thickness

In the case where the thickness is less than 10 μm, the thickness was measured using a spectrophotometer for a thin film "Instantaneous multi-measurement system MCPD-2000" (trade name) manufactured by Otsuka Electronics Co., Ltd. In the case where the thickness is 10 μm or more, the thickness was measured using a digital micrometer "KC-351C type" manufactured by Anritsu Corporation.

(7) Method of Measuring Glass Transition Temperature:

A glass transition temperature was obtained by a method according to JIS K 7121 (1987) (method of measuring a transition temperature of plastic), using a differential scanning calorimeter "DSC-6200" (trade name) manufactured by Seiko Corporation. Specifically, 3 mg of a powder sample was measured twice by raising the temperature thereof (heating speed: 10° C./minute) in a nitrogen atmosphere (flow rate of gas: 80 ml/minute), and the second data was adopted. The calorimeter was corrected for a temperature using a standard material (indium).

(8) Method of Measuring Absolute Value of Photoelastic Coefficient (C[590]):

A retardation value (23° C./wavelength of 590 nm) at the center of a sample (size: 2 cm×10 cm) was measured while a stress (5 to 15 N) was being applied with both ends of the sample sandwiched, using a spectroscopic ellipsometer ["M-220" (trade name) manufactured by JSCO Corporation], and the absolute value of a photoelastic coefficient was calculated from the slope of a function of the stress and the retardation value.

(9) Method of Measuring Contrast Ratio of Liquid Crystal Display Apparatus

After the elapse of 30 minutes from the lighting of a backlight in a dark room at 23° C., a Y-value of an XYZ display system in a front direction in the case of displaying a white image and a black image was measured, using "EZ Contrast 160D" (trade name) manufactured by ELDIM, Inc. A contrast ratio "YW/YB" in a front direction was calculated from a Y-value (YW: white brightness) in a white image and a Y-value (YB: black brightness) in a black image.

Production of Polarizing Plate

Reference Example 1

A polymer film ("VF-PS#7500" (trade name) manufactured by Kuraray Co., Ltd.) with a thickness of 75 μm, containing as a main component a polyvinyl alcohol-based resin, was soaked in 5 baths under the following (1) to (5) conditions while a tension was being applied to the polymer film in a film longitudinal direction, and the polymer film was stretched so that the final stretching ratio became 6.2 times the original film length. The stretched film was dried for one minute in an air circulation type dry oven at 40° C., whereby a polarizer A was produced. A polymer film ("ZRF80S" (trade name), Re[590]=0.1 nm, Rth[590]=1 nm, manufactured by Fuji Photo Film Co., Ltd.) with a thickness of 80 μm containing a cellulose-based resin was bonded to both sides of the polarizer A via a water-soluble adhesive ("Gohsefimer 2200" (trade name) manufactured by Nippon Synthetic Chemical Industry Co., Ltd.) containing as a main component a polyvinyl alcohol-based resin, whereby a polarizing plate A was produced. The properties of the polarizing plate A are shown in the following Table 1.
<Conditions>
(1) Swelling bath: pure water at 30° C.
(2) Coloring bath: Aqueous solution at 30° C. containing 0.035 parts by weight of iodine with respect to 100 parts by weight of water and 0.2 parts by weight of potassium iodide with respect to 100 parts by weight of water
(3) First cross-linking bath: Aqueous solution at 40° C. containing 3% by weight of potassium iodide and 3% by weight of boric acid
(4) Second cross-linking bath: Aqueous solution at 60° C. containing 5% by weight of potassium iodide and 4% by weight of boric acid
(5) Washing bath: Aqueous solution at 25° C. containing 3% by weight of potassium iodide Reference Example 2

A polarizing plate B was produced in the same conditions and method as in Reference Example 1 except that: the addition amount of iodine in the condition (2) in the coloring bath was changed to 0.032 parts by weight with respect to 100 parts by weight of water. The properties of the polarizing plate B are shown in the following Table 1.

Reference Example 3

A polarizing plate C was produced in the same conditions and method as in Reference Example 1 except that: the addition amount of iodine in the condition (2) in the coloring bath was changed to 0.030 parts by weight with respect to 100 parts by weight of water. The properties of the polarizing plate C are shown in the following Table 1.

Reference Example 4

A polarizing plate D was produced in the same conditions and method as in Reference Example 1 except that: the addition amount of iodine in the condition (2) in the coloring bath was changed to 0.028 parts by weight with respect to 100 parts by weight of water. The properties of the polarizing plate D are shown in the following Table 1.

Reference Example 5

A polarizing plate E was produced in the same conditions and method as in Reference Example 1 except that: the addition amount of iodine in the condition (2) in the coloring bath was changed to 0.025 parts by weight with respect to 100 parts by weight of water. The properties of the polarizing plate E are shown in the following Table 1.

Reference Example 6

As a polarizing plate F, a commercially available polarizing plate (trade name: "NPF SIG1423DU", manufactured by Nitto Denko Corporation) was used as it is. The polarizing plate F had a light transmittance of 41.8% and a degree of polarization of 99.9%.

Reference Example 7

As a polarizing plate G, a commercially available polarizing plate (trade name: "NPF SIG1224DU", manufactured by Nitto Denko Corporation) was used as it is. The polarizing plate G had a light transmittance of 42.6% and a degree of polarization of 99.9%.

TABLE 1

|  | Reference Example 1 | Reference Example 2 | Reference Example 3 | Reference Example 4 | Reference Example 5 |
|---|---|---|---|---|---|
| Polarizer | A | B | C | D | E |
| Thickness (μm) | 30 | 30 | 30 | 30 | 30 |
| Light transmittance (%) | 39.3 | 41.1 | 42.9 | 43.3 | 44.1 |
| Degree of polarization (%) | 99.99 | 99.99 | 99.96 | 99.99 | 99.96 |
| Iodine content (% by weight) | 3.81 | 3.03 | 2.82 | 2.13 | 2.06 |
| Potassium content (% by weight) | 0.74 | 0.58 | 0.64 | 0.50 | 0.52 |
| Boron content (% by weight) | 2 | 2 | 2 | 2 | 2 |

Production of Liquid Crystal Cell

Reference Example 8

A liquid crystal panel was taken out from a liquid crystal display apparatus [Liquid crystal TV "VIERA" (trade name) (Type No: TH32-LX60, Screen size: 698 mm×392 mm), manufactured by Panasonic] including a liquid crystal cell of an IPS mode, all the optical films placed on upper and lower sides of the liquid crystal cell were removed, and glass surfaces (front and back) of the liquid crystal cell were washed. A liquid crystal cell thus produced was set to be a liquid crystal cell A.

Reference Example 9

A liquid crystal panel was taken out from a liquid crystal display apparatus [Liquid crystal TV "Wooo" (trade name) (Type No: W32-H8000, Screen size: 698 mm×392 mm), manufactured by Hitachi Co., Ltd.] including a liquid crystal cell of an IPS mode, all the optical films placed on upper and lower sides of the liquid crystal cell were removed, and glass surfaces (front and back) of the liquid crystal cell were washed. A liquid crystal cell thus produced was set to be a liquid crystal cell B.

Production of Liquid Crystal Panel and Liquid Crystal Display Apparatus

Example 1

The polarizing plate B produced in Reference Example 2 as the first polarizing plate was attached to a viewer side of the liquid crystal cell A produced in Reference Example 8 so that an absorption axis direction of the polarizing plate B became substantially parallel to a longitudinal direction of the liquid crystal cell A via an acrylic pressure-sensitive adhesive (thickness: 20 μm). Then, a polarizing plate E produced in Reference Example 5 was attached as a second polarizing plate to an opposite side (backlight side) of the liquid crystal cell A with respect to a the viewer side so that an absorption axis direction of the polarizing plate E became substantially perpendicular to a longitudinal direction of the liquid crystal cell A via an acrylic pressure-sensitive adhesive (thickness: 20 μm). A liquid crystal panel A thus produced has a configuration of an O-mode. The liquid crystal panel A was combined with a backlight unit to produce a liquid crystal apparatus A. The backlight was continued to light for 30 minutes, and then, a white brightness and a black brightness in a front direction of the liquid crystal display apparatus A were measured to obtain a contrast ratio. The properties of the obtained liquid crystal display apparatus A are shown in the following Table 2.

Example 2

A liquid crystal panel B and a liquid crystal display apparatus B were produced in the same manner as in Example 1 except that: the polarizing plate D produced in Reference Example 4 was used as the second polarizing plate. The properties of the obtained liquid crystal display apparatus B are shown in the following Table 2.

Example 3

A liquid crystal panel C and a liquid crystal display apparatus C were produced in the same manner as in Example 1 except that: the polarizing plate C produced in Reference Example 3 was used as the second polarizing plate. The properties of the obtained liquid crystal display apparatus C are shown in the following Table 2.

Comparative Example 1

A liquid crystal panel M and a liquid crystal display apparatus M were produced in the same manner as in Example 1 except that: the polarizing plate B produced in Reference Example 2 was used as the second polarizing plate. The crystal display apparatus M are shown in the following Table 2.

Comparative Example 2

A liquid crystal panel N and a liquid crystal display apparatus N were produced in the same manner as in Example 1 except that: the polarizing plate A produced in Reference Example 1 was used as the second polarizing plate. The crystal display apparatus N are shown in the following Table 2.

Example 4

A liquid crystal panel D and a liquid crystal display apparatus D were produced in the same manner as in Example 1 except that: the polarizing plate C produced in Reference Example 3 was used as the first polarizing plate. The crystal display apparatus D are shown in the following Table 2.

Example 5

A liquid crystal panel E and a liquid crystal display apparatus E were produced in the same manner as in Example 1 except that: the polarizing plate C produced in Reference Example 3 was used as the first polarizing plate and the polarizing plate D produced in Reference Example 4 was used as the second polarizing plate. The properties of the obtained liquid crystal display apparatus E are shown in the following Table 2.

Comparative Example 3

A liquid crystal panel O and a liquid crystal display apparatus O were produced in the same manner as in Example 1 except that: two polarizing plates C produced in Reference Example 3 were used as the first and second polarizing plates. The properties of the obtained liquid crystal display apparatus O are shown in the following Table 2.

Comparative Example 4

A liquid crystal panel P and a liquid crystal display apparatus P were produced in the same manner as in Example 1 except that: the polarizing plate C produced in Reference Example 3 was used as the first polarizing plate and the polarizing plate B produced in Reference Example 2 was used as the second polarizing plate. The properties of the obtained liquid crystal display apparatus P are shown in the following Table 2.

Example 6

A liquid crystal panel F and a liquid crystal display apparatus F were produced in the same manner as in Example 1 except that: the polarizing plate A produced in Reference Example 1 was used as the first polarizing plate and the polarizing plate D produced in Reference Example 4 was used as the second polarizing plate. The properties of the obtained liquid crystal display apparatus F are shown in the following Table 2.

Comparative Example 5

A liquid crystal panel Q and a liquid crystal display apparatus Q were produced in the same manner as in Example 1 except that: the polarizing plate D produced in Reference Example 4 was used as the first polarizing plate and the polarizing plate A produced in Reference Example 1 was used as the second polarizing plate. The properties of the obtained liquid crystal display apparatus Q are shown in the following Table 2.

TABLE 2

| | First polarizer | $T_1$ (%) | Second polarizer | $T_2$ (%) | ΔT ($T_2 - T_1$) | White brightness (Y) | Black brightness (Y) | Contrast ratio |
|---|---|---|---|---|---|---|---|---|
| Example 1 | B | 41.1 | E | 44.1 | 3.0 | 325 | 0.758 | 447 |
| Example 2 | B | 41.1 | D | 43.3 | 2.2 | 324 | 0.713 | 455 |
| Example 3 | B | 41.1 | C | 42.9 | 1.8 | 299 | 0.622 | 489 |
| Comparative Example 1 | B | 41.1 | B | 41.1 | 0 | 303 | 0.78 | 389 |
| Comparative Example 2 | B | 41.1 | A | 39.3 | −1.8 | 292 | 0.754 | 389 |
| Example 4 | C | 42.9 | E | 44.1 | 1.2 | 333 | 0.782 | 431 |
| Example 5 | C | 42.9 | D | 43.3 | 0.4 | 332 | 0.684 | 486 |
| Comparative Example 3 | C | 42.9 | C | 42.9 | 0 | 387 | 0.847 | 387 |
| Comparative Example 4 | C | 42.9 | B | 41.1 | −1.8 | 380 | 0.82 | 380 |
| Example 6 | A | 39.3 | D | 43.3 | 4.0 | 301 | 0.555 | 544 |
| Comparative Example 5 | D | 43.3 | A | 39.3 | −4.0 | 303 | 0.892 | 343 |

Example 7

The polarizing plate F of Reference Example 6 was attached as the first polarizing plate to a viewer side of the liquid crystal cell B produced in Reference Example 9 so that an absorption axis direction of the polarizing plate F became substantially parallel to a longitudinal direction of the liquid crystal cell B via an acrylic pressure-sensitive adhesive (thickness: 20 μm). Then, the polarizing plate G of Reference Example 7 was attached as the second polarizing plate to an opposite side (backlight side) of the liquid crystal cell B with respect to the viewer side so that an absorption axis direction of the polarizing plate G became substantially perpendicular to a longitudinal direction of the liquid crystal cell B via an acrylic pressure-sensitive adhesive (thickness: 20 μm). A liquid crystal panel G thus produced has a configuration of an E-mode. The liquid crystal panel G was combined with a backlight unit to produce a liquid crystal apparatus G. The backlight was continued to light for 30 minutes, and then, a white brightness and a black brightness in a front direction of the liquid crystal display apparatus G were measured to obtain a contrast ratio. The properties of the obtained liquid crystal display apparatus G are shown in the following Table 3.

Comparative Example 6

A liquid crystal panel R and a liquid crystal display apparatus R were produced in the same manner as in Example 7 except that: the polarizing plate F of Reference Example 6 was used as the second polarizing plate. The properties of the obtained liquid crystal display apparatus R are shown in the following Table 3.

Comparative Example 7

A liquid crystal panel S and a liquid crystal display apparatus S were produced in the same manner as in Example 7 except that: the polarizing plate G of Reference Example 7 was used as the first polarizing plate and the polarizing plate F of Reference Example 6 was used as the second polarizing plate. The properties of the obtained liquid crystal display apparatus S are shown in the following Table 3.

Example 8

A liquid crystal panel H and a liquid crystal display apparatus H were produced in the same manner as in Example 7 except that: a brightness enhancing film (trade name: "NIPOCS APCF", manufactured by Nitto Denko Corporation) was placed on the opposite side of the second polarizing plate with respect to the liquid crystal cell side. The properties of the obtained liquid crystal display apparatus H are shown in the following Table 3.

Comparative Example 8

A liquid crystal panel T and a liquid crystal display apparatus T were produced in the same manner as in Comparative Example 6 except that: a brightness enhancing film (trade name: "NIPOCS APCF", manufactured by Nitto Denko Corporation) was placed on the opposite side of the second polarizing plate with respect to the liquid crystal cell side. The properties of the obtained liquid crystal display apparatus T are shown in the following Table 3.

Comparative Example 9

A liquid crystal panel U and a liquid crystal display apparatus U were produced in the same manner as in Comparative Example 7 except that: a brightness enhancing film (trade name: "NIPOCS APCF", manufactured by Nitto Denko Corporation) was placed on the opposite side of the second polarizing plate with respect to the liquid crystal cell side. The properties of the obtained liquid crystal display apparatus U are shown in the following Table 3.

TABLE 3

| | First polarizer | $T_1$ (%) | Second polarizer | $T_2$ (%) | ΔT ($T_2 - T_1$) | White brightness (Y) | Black brightness (Y) | Contrast ratio |
|---|---|---|---|---|---|---|---|---|
| Example 7 | F | 41.8 | G | 42.6 | 0.8 | 445 | 0.56 | 795 |
| Comparative Example 6 | F | 41.8 | F | 41.8 | 0 | 438 | 0.56 | 782 |

TABLE 3-continued

|  | First polarizer | $T_1$ (%) | Second polarizer | $T_2$ (%) | $\Delta T$ ($T_2 - T_1$) | White brightness (Y) | Black brightness (Y) | Contrast ratio |
|---|---|---|---|---|---|---|---|---|
| Comparative Example 7 | G | 42.6 | F | 41.8 | −0.8 | 444 | 0.62 | 716 |
| Example 8* | F | 41.8 | G | 42.6 | 0.8 | 567 | 0.74 | 766 |
| Comparative Example 8* | F | 41.8 | F | 41.8 | 0 | 553 | 0.75 | 737 |
| Comparative Example 9* | G | 42.6 | F | 41.8 | −0.8 | 569 | 0.83 | 686 |

*Liquid crystal panel having a brightness enhancing film on an opposite side where a liquid crystal cell of a second polarizer is placed.

[Evaluation]

As shown in Examples 1 to 8, in the liquid crystal display apparatuses having the liquid crystal panel of the present invention, a remarkably high contrast ratio in a front direction was obtained, compared with the one using a conventional liquid crystal panel, by setting the light transmittance ($T_2$) of the second polarizing plate to be larger than the light transmittance ($T_1$) of the first polarizing plate. On the other hand, in the liquid crystal display apparatuses of Comparative Examples 1 to 9, the light transmittance ($T_2$) of the second polarizing plate is equal to the light transmittance ($T_1$) of the first polarizing plate, or the light transmittance ($T_2$) of the second polarizing plate is smaller than the light transmittance ($T_1$) of the first polarizing plate, and thus, a contrast ratio in a front direction was low in these apparatuses.

INDUSTRIAL APPLICABILITY

As described above, the liquid crystal panel of the present invention exhibits a high contrast ratio in a front direction in the case of being used in a liquid crystal display apparatus. Therefore, the liquid crystal panel of the present invention is very useful for the enhancement of display properties of, for example, a personal computer monitor and a liquid crystal television.

The invention claimed is:

1. A liquid crystal panel of a normally black mode, comprising:
    a liquid crystal cell;
    a first polarizing plate placed on a viewer side of the liquid crystal cell; and
    a second polarizing plate placed on an opposite side of the liquid crystal cell with respect to the viewer side,
    wherein a light transmittance ($T_2$) of the second polarizing plate is larger than a light transmittance ($T_1$) of the first polarizing plate,
    the light transmittance ($T_1$) of the first polarizing plate is 38.3% to 42.9%,
    the light transmittance ($T_2$) of the second polarizing plate is 41.1% to 44.3%,
    a difference ($\Delta T = T_2 - T_1$) between the light transmittance ($T_2$) of the second polarizing plate and the light transmittance ($T_1$) of the first polarizing plate is 0.1% to 3.0%,
    the liquid crystal cell includes a liquid crystal layer containing liquid crystal molecules arranged in a homogeneous alignment in the absence of an electric field, and
    degrees of polarization of the first polarizing plate and the second polarizing plate are 99.8% or more.

2. The liquid crystal panel according to claim 1, wherein the first polarizing plate includes a first polarizer, the second polarizing plate includes a second polarizer, and the first polarizer and the second polarizer respectively contain as a main component an iodine-containing polyvinyl alcohol-based resin.

3. The liquid crystal panel according to claim 2, wherein a difference ($\Delta I = I_1 - I_2$) between an iodine content ($I_1$) of the first polarizer and an iodine content ($I_2$) of the second polarizer is 0.1% by weight to 1.9% by weight.

4. The liquid crystal panel according to claim 2, wherein the iodine content of the first polarizer and/or the second polarizer is 2.0% by weight to 5.0% by weight.

5. The liquid crystal panel according to claim 2, wherein the first polarizer and/or the second polarizer further contain potassium, and a content of the potassium is 0.2% by weight to 1.0% by weight.

6. The liquid crystal panel according to claim 1, further comprising a brightness enhancing film on an opposite side of the second polarizing plate with respect to the liquid crystal cell side.

7. The liquid crystal panel according to claim 6, wherein the brightness enhancing film is a laminate including a thermoplastic resin layer (A) and a thermoplastic resin layer (B), and an in-plane birefringence of the thermoplastic resin layer (A) is 0.05 or more.

8. A liquid crystal display apparatus, comprising the liquid crystal panel according to claim 1.

* * * * *